(12) United States Patent
Ostermann

(10) Patent No.: US 10,428,643 B2
(45) Date of Patent: Oct. 1, 2019

(54) DOWNHOLE LINE DETECTION TECHNOLOGIES

(71) Applicant: HALLIBURTON ENERGY SERVICES, INC., Houston, TX (US)

(72) Inventor: Neil Alan Ostermann, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 204 days.

(21) Appl. No.: 15/549,475

(22) PCT Filed: Apr. 19, 2016

(86) PCT No.: PCT/US2016/028226
§ 371 (c)(1),
(2) Date: Aug. 8, 2017

(87) PCT Pub. No.: WO2017/184116
PCT Pub. Date: Oct. 26, 2017

(65) Prior Publication Data
US 2018/0066511 A1   Mar. 8, 2018

(51) Int. Cl.
*E21B 43/119*   (2006.01)
*E21B 47/09*   (2012.01)
(Continued)

(52) U.S. Cl.
CPC ............ *E21B 47/0905* (2013.01); *G01V 3/18* (2013.01); *G01V 3/38* (2013.01)

(58) Field of Classification Search
CPC .. E21B 43/119; E21B 47/024; E21B 47/0905; E21B 43/116
See application file for complete search history.

(56) References Cited

U.S. PATENT DOCUMENTS

| 4,933,640 A | * | 6/1990 | Kuckes | ............. E21B 47/02216 |
| | | | | 166/66.5 |
| 5,657,826 A | * | 8/1997 | Kuckes | .................. E21B 7/046 |
| | | | | 175/45 |

(Continued)

FOREIGN PATENT DOCUMENTS

| WO | 2014100272 A1 | 6/2014 |
| WO | 2015052508 A2 | 4/2015 |
| WO | 2015188083 A1 | 12/2015 |

OTHER PUBLICATIONS

International Search Report and Written Opinion; PCT Application No. PCT/US2016/028226; dated Dec. 15, 2016.

*Primary Examiner* — Kipp C Wallace
(74) *Attorney, Agent, or Firm* — Polsinelli PC

(57) ABSTRACT

Systems, methods, and computer-readable media for downhole line detection. A system can send an electrical signal down an electric line that runs down an outside of a downhole casing of a wellbore. A downhole sensor system located at a downhole location inside the downhole casing can detect a magnetic field generated by a current of the electrical signal. Next, the system can identify a one or more characteristics of the magnetic field and/or the electrical signal. Based on the one or more characteristics, the system can determine a first position of the electric line relative to the downhole casing or the downhole sensor system. The system can then infer, based on the first position of the electric line, a second position of a non-electroconductive cable that runs alongside the electric line outside of the downhole casing of the wellbore.

21 Claims, 8 Drawing Sheets

(51) Int. Cl.
  *G01V 3/18*   (2006.01)
  *G01V 3/38*   (2006.01)

(56) References Cited

U.S. PATENT DOCUMENTS

| | | | |
|---|---|---|---|
| 6,313,755 B1* | 11/2001 | Hetmaniak | E21B 47/122 340/856.3 |
| 6,378,607 B1 | 4/2002 | Ryan et al. | |
| 6,563,303 B1* | 5/2003 | Watkins | E21B 47/04 324/206 |
| 8,201,625 B2* | 6/2012 | Almaguer | E21B 7/061 166/250.08 |
| 10,036,243 B2* | 7/2018 | Schlembach | E21B 47/0905 |
| 10,208,584 B2* | 2/2019 | Wilson | E21B 7/04 |
| 2006/0048937 A1* | 3/2006 | Pinto | E21B 43/119 166/255.2 |
| 2008/0030365 A1 | 2/2008 | Fripp et al. | |
| 2010/0207711 A1 | 8/2010 | Estes | |
| 2013/0279841 A1* | 10/2013 | Joinson | E21B 47/0905 385/12 |
| 2016/0069163 A1* | 3/2016 | Tolman | E21B 23/10 166/297 |
| 2016/0258271 A1* | 9/2016 | McCoy | E21B 47/00 |
| 2016/0290835 A1* | 10/2016 | McCoy | E21B 17/026 |

\* cited by examiner

DOWNHOLE LINE DETECTION TECHNOLOGIES

CROSS-REFERENCE TO RELATED APPLICATIONS

This application is a national stage entry of PCT/US2016/028226 filed Apr. 19, 2016, said application is expressly incorporated herein in its entirety.

TECHNICAL FIELD

The present technology pertains to downhole telemetry and more specifically to downhole detection of non-electroconductive lines.

BACKGROUND

Service companies often place fiber optic cables downhole along the casing of a hydrocarbon well, to communicate properties and conditions at different positions downhole. Generally, these cables are installed prior to perforating the casing of the hydrocarbon well. Unfortunately, it can be very difficult to detect the presence and location of downhole fiber optic cables. For example, fiber optic cables transmit signals via light-based technology. Therefore, fiber optic cables do not carry an electrical current that could be used to detect their presence or location. Moreover, since the fiber optic strands in fiber optic cables are not made of metal, fiber optic cables do not hold a sufficient metallic mass to allow detection. Even though a metallic sheathing may be used to protect fiber optic cables, the amount of metal in such sheathing is insignificant for detection purposes. Accordingly, because fiber optic cables generally cannot be detected or located downhole, these cables are often damaged when service companies perforate the casing.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1A:
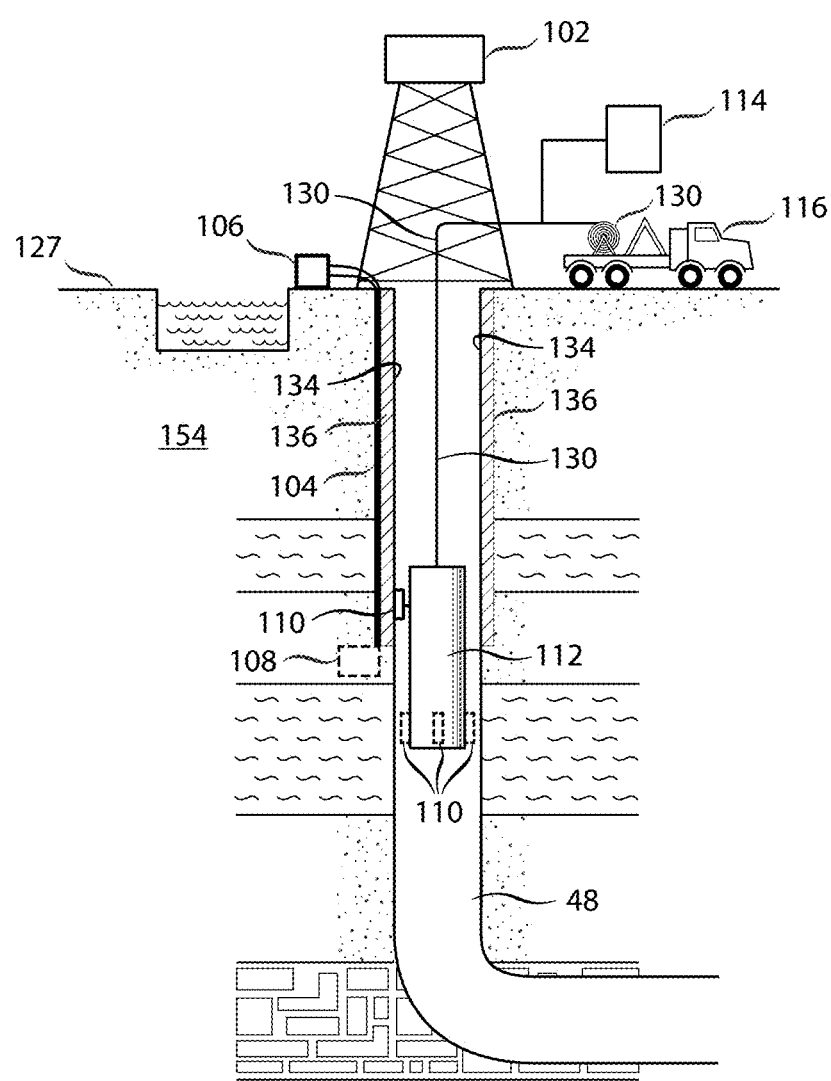
FIG. 1A illustrates a schematic diagram of an example system for downhole line detection in a downhole environment with a wireline system.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "coupled" is defined as connected, whether directly or indirectly through intervening components, and is not necessarily limited to physical connections. The term "substantially" is defined to be essentially conforming to the particular dimension, shape or other word that substantially modifies, such that the component need not be exact. For example, substantially rectangular means that the object in question resembles a rectangle, but can have one or more deviations from a true rectangle. The phrase "wellbore tubular" is defined as one or more types of connected tubulars as known in the art, and can include, but is not limited to, tubing, production tubing, jointed tubing, coiled tubing, casings, liners, drill pipe, landing string, combinations thereof, or the like. The term "transceiver" is defined as a combination of a transmitter/receiver in one package but can include a separate transmitter and a separate receiver in one package or two packages.

As used herein, the "position" of an object can refer to a placement of the object, location of the object, angle of the object, plane of the object, direction of the object, distance of the object, azimuth of the object, axis of the object, inclination of the object, horizontal position of the object, vertical position of the object, and so forth. Moreover, the "position" of an object can refer to the absolute or exact position of the object, the measured or estimated position of the object, and/or the relative position of the object to another object.

In downhole applications, it can be difficult to detect non-electroconductive cables, such as fiber optic cables, or ascertain their placement and location downhole. As a result, since non-electroconductive cables are typically installed prior to perforating the casing of the well, non-electroconductive cables are often damaged when perforating the casing of the well. The approaches set forth herein can allow for detection of placement and location of non-electroconductive cables downhole to avoid perforating or damaging the non-electroconductive cables during perforation operations.

For example, the approaches set forth herein can detect and identify the angular position of non-electroconductive cables downhole. To detect and identify the angular position of non-electroconductive cables, electrical conductors, such as electrical cables, can be placed alongside the non-electroconductive cables. A signal with a predetermined current and/or frequency pattern can be transmitted down the electrical conductors to generate a magnetic field. A downhole sensor system can detect the magnetic field and identify the predetermined current and/or frequency pattern. A system can collect measurements of the magnetic field and/or the electrical signal from the downhole sensor system, and use the measurements to detect the placement and location of the electrical conductors, which it can use to infer the placement and location of the non-electroconductive cables downhole.

The downhole line detection approaches disclosed herein can be implemented in various wellbore environments and phases of producing and utilizing a well. Additionally, various tubulars may be provided downhole for production or delivery of fluids downhole. Fiber optic cables can be provided along a casing of the well for implementing optical telemetry. An electric line for running a current can also run alongside the fiber optic cables. Sensors can be provided within the casing at various locations downhole for sensing the current running through the electric line in order to detect or infer the position (e.g., location, placement, angle, configuration, direction, azimuth, plane, etc.) of the fiber optic cables.

An exemplary downhole wellbore environment for implementation in a wireline system is illustrated in FIG. 1A. As illustrated in FIG. 1A, a downhole tool unit 112 can be employed with wireline systems to carry out logging, or other sensing and detecting operations. The collected data can include various properties and conditions, such as formation rock properties, fluid density, temperature, pressure, resistivity, or porosity, among other characteristics and properties in a downhole environment. A downhole tool unit 112 can be lowered into the wellbore 48 of formation 154 by wireline conveyance 130. A casing 134 can be secured within the wellbore 48 by a casing material 136, such as cement.

The wireline conveyance 130 can be anchored in the rig 102 or portable or mobile units such as a truck 116. The wireline conveyance 130 can provide support for the tool 112, enable communication with the tool processors and units (e.g., 106 and/or 114) on the surface 127 outside the wellbore 48, and provide a power supply. The wireline conveyance 130 can include one or more wires, wireline, slickline, cables, tubulars, and the like. The wireline conveyance 130 can include fiber optic cabling for carrying out communications. The optical cable can be provided in an interior and/or exterior of the conveyance 130. The wireline conveyance 130 can be sufficiently strong and flexible to tether the downhole tool unit 112 through the wellbore 48, while also permitting communication through the wireline conveyance 130 to surface tools unit 114. Additionally, power can be supplied via the wireline conveyance 130 to meet power requirements of the tool 112.

A wire system 104 can be provided along the casing 134. For example, the wire system 104 can extend alongside an external portion of the casing 134. The wire system 104 can include non-electroconductive cables, such as fiber optic cables, which can be coupled with processing system 106 on the surface 127. The non-electroconductive cables, such as fiber optic cables, may also be coupled with processing system 108 downhole, although the processing system 108 may not be implemented in some configurations. The non-electroconductive cables can communicate data, such as detected properties and conditions, with processing system 106. In some configurations, the non-electroconductive cables may also communicate data with processing system 108. The non-electroconductive cables can also be coupled with the wireline conveyance 130 to communicate with other surface tools and processors, such as surface tools unit 114, through the wireline conveyance 130.

Surface tools unit 114 can control the tools 112 and sensors 110. Surface tools unit 114 may be coupled, directly or indirectly, with processing system 106 to control the signals transmitted through the wire system 104. A direct line of communication between tools 112 and wire system 104 may not be necessary. However, in some aspects, the tools 112 and wire system 104 can have a direct line of communication.

Processing systems 106 and 108 can include one or more processors, transceivers, memories, storage devices, sensors, communications interfaces, power supplies, etc. For example, processing systems 106 and 108 can include telemetry units for communicating and processing data and signals. Thus, processing systems 106 and 108 can detect, receive, transmit, store, and process data, such as properties, conditions, and characteristics, for example. As previously mentioned, processing systems 106 and 108 can receive and transmit data via non-electroconductive cables in the wire system 104, as well as the wireline conveyance 130.

The wire system 104 can also include an electric line for carrying signals and currents. The electric line can include one or more electroconductive cables, such as copper cables. Processing system 106 can transmit a signal or current through the electric line in the wire system 104 in order to generate a magnetic field around the wire system 104. The signal can be based on a known or predetermined pattern, such as a current and/or frequency pattern. Processing system 106 can transmit multiple signals and vary the pattern of one or more signals. Moreover, processing system 106 can turn on or off and/or modify or change a pattern or strength of signals transmitted through the electric line.

A sensor system 110 can be placed in an inside of the casing 134 for detecting the pattern of the signal carried by the electric line in the wire system 104, and/or detect the magnetic field generated by signal. For example, the sensor system 110 can be coupled with the tool 112 inside the casing 134 to detect the magnetic field from the wire system 104 and the pattern of the signal that generated the magnetic field. In addition or alternatively, sensor system 110 can have multiple sensors located radially around the outside of tools unit 112 or the inside of the casing 134, for measuring the magnetic field and pattern of the signal from various respective locations.

Sensor system 110 can obtain measurements of the magnetic field generated by the signal transmitted by processing system 106 through the electric line in the wire system 104, and/or any patterns of the signal transmitted through the electric line. Sensor system 110 can communicate the measurements to surface tools unit 114, processing system 106, processing system 108, and/or any other processing tool or system. The measurements can be used to infer or determine a position (e.g., placement, location, angle, plane, azimuth, distance, direction, etc.) of the wire system 104 relative to the casing 134 and/or the tool 112. For example, the measurements can be used to infer the location and angular position of the wire system 104 relative to the casing 134.

The determined placement and/or location of the wire system 104 can be used to infer the placement and/or location of any non-electroconductive cables in the wire system 104, and avoid damaging the non-electroconductive cables in the wire system 104 when perforating the casing 134. For example, by knowing the placement and/or location of the wire system 104, perforation locations of the casing 134 can be carefully selected to avoid perforating through the wire system 104.

Since non-electroconductive cables, such as fiber optic cables, are not capable of carrying a current, the electric line in the wire system 104 can be leveraged to carry signals with predetermined patterns and produce a particular magnetic field, which can be used to infer a placement and/or location of the non-electromagnetic cables. This way, the locations for perforating the casing 134 during any perforation operations can be carefully or precisely selected to avoid the inferred placement and location of the non-electroconductive cables.

The sensor system 110 can include one or more sensors for detecting a magnetic field and/or a pattern of the signal generating the magnetic field. For example, the sensor system 110 can be configured to detect a magnetic field, as well as a current and/or frequency signal pattern for any signals transmitted through the electric line in the wire system 104. In some examples, the sensor system 110 can include a rotating sensor coupled with the tool 112. The rotating sensor here can rotate with the tool 112 along an inside diameter of the casing 134 to obtain measurements and positioning information at different angles, positions, and/or locations.

In some examples, the sensor system 110 can include multiple sensors located radially around an outside of the tool 112 and/or an inside of the casing 134. The multiple sensors can be configured to obtain measurements from their respective locations or placements, which can be used to identify the location or angular position of the wire system 104 without having to perform sensor rotations around the inside diameter of the casing 134. The multiple sensors can collect measurements of the signal and/or magnetic field from their respective locations around the tool 112 and/or casing 134, without rotating around the tool 112 and/or casing 134 to obtain measurements at various locations.

Figure 1B:
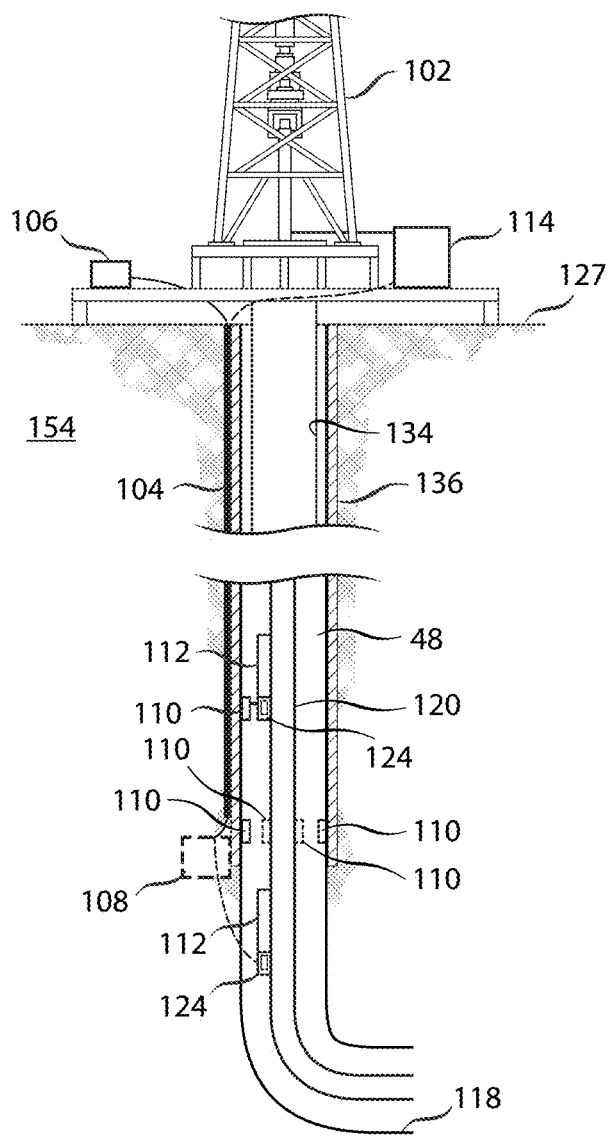
FIG. 1B illustrates a schematic diagram of an example system for downhole line detection in a downhole environment having tubulars.

An additional downhole wellbore environment for implementation of the technologies disclosed herein is illustrated in FIG. 1B. As shown, the operating environment can include a rig 102 that is positioned on the earth's surface 127 and extends over and around a wellbore 48 that penetrates a subterranean formation 154 for the purpose of recovering hydrocarbons. As shown, the wellbore 48 may extend substantially vertically away from the earth's surface 127 and transition to a horizontal wellbore portion 118. The wellbore can include a wellbore casing 134, which can be cemented into place in at least a portion of the wellbore 48.

A wellbore tubular 120 can be lowered into the subterranean formation 154 for a variety of drilling, completion, workover, treatment, and/or production processes throughout the life of the wellbore. The wellbore tubular 120 can include those provided in the wellbore during completion operations, where hydrocarbon is withdrawn through the wellbore tubular 120 from producing formations. The wellbore tubular 120 can operate in any of the wellbore orientations (e.g., vertical, deviated, horizontal, and/or curved) and/or types described herein.

One or more downhole tools unit 112 can be coupled with the wellbore tubular 120 within the wellbore 48. One or more telemetry units 124 can be coupled with the wellbore tubular 120 within the wellbore 48. Typically, the one or more downhole tools unit 112 and the one or more telemetry units 124 are coupled on the outside of the wellbore tubular 120. Each downhole tools unit 112 is communicatively coupled with one or more telemetry units 124. For example, fiber optic cable can be provided along the length of the tubular 120 and couple with the tool assemblies for communication to and from the surface 127. Each downhole tools unit 112 can have a corresponding telemetry unit 124 and/or a single telemetry unit can communicate with one or more downhole tools unit 112. Often, performing an operation in the wellbore 48 can require a plurality of different downhole tools. For example, in the completion of a well, a sampling device can sometimes be deployed downhole to collect hydrocarbon samples in a production zone.

To communicate data to the surface tools unit 114, downhole tools unit 112 can include a source assembly. The source assembly can generate an optical signal indicative of the downhole data and can transmit the optical signal towards the surface tools unit 114 via the fiber optic cable. At the surface, a receiver assembly can be included in surface tools unit 114 and can receive the optical signal from the source assembly.

Wire system 104 can be placed alongside the casing 134. For example, wire system 104 can run alongside an outside of casing 134 and casing material 136. As previously mentioned, wire system 104 can include an electric line and one or more non-electroconductive cables, such as fiber optic cables. The lines or cables in the wire system 104 can be coupled with processing system 106 on the surface 127 and processing system 108 downhole. For example, the electroconductive lines or cables in the wire system 104 can be electrically coupled with the processing system 106 and/or 108, and the non-electroconductive cables can be coupled via a corresponding connector and/or interface, such as a fiber optic interface, connector, module, etc. The lines or cables in the wire system 104 can also communicate with tools unit 112 and/or telemetry unit 124, either directly or indirectly. For example, in some configurations, the lines or cables in the wire system 104 can couple with telemetry unit 124 directly or indirectly through processing system 108 and/or any other intervening wire(s) or device(s).

Sensor system 110 can be placed at one or more locations. For example, sensor system can have a sensor coupled with tools unit 112 and/or telemetry unit 124. Sensor system 110 can also have another sensor coupled with another tools unit 112 or telemetry unit 124 at a different location within the wellbore 48 or tubular 120. In addition or alternatively, sensor system 110 can have multiple sensors radially around the outside of tools unit 112 or tubular 120.

While FIGS. 1A and 1B are illustrated with a rig 102, the present disclosure contemplates that the operations and technologies described herein can be implemented in rigless configurations (i.e., configurations with no rig 102). Moreover, various rigless configurations are contemplated herein. To illustrate, in an example rigless configuration, a mobile crane can be parked near the top of the well 48 (e.g., near the well head). The wireline 130 can run from the truck 116 through two sheave wheels. One of the sheave wheels can be tied to the well head itself and the other held by the mobile crane.

Figure 2A:
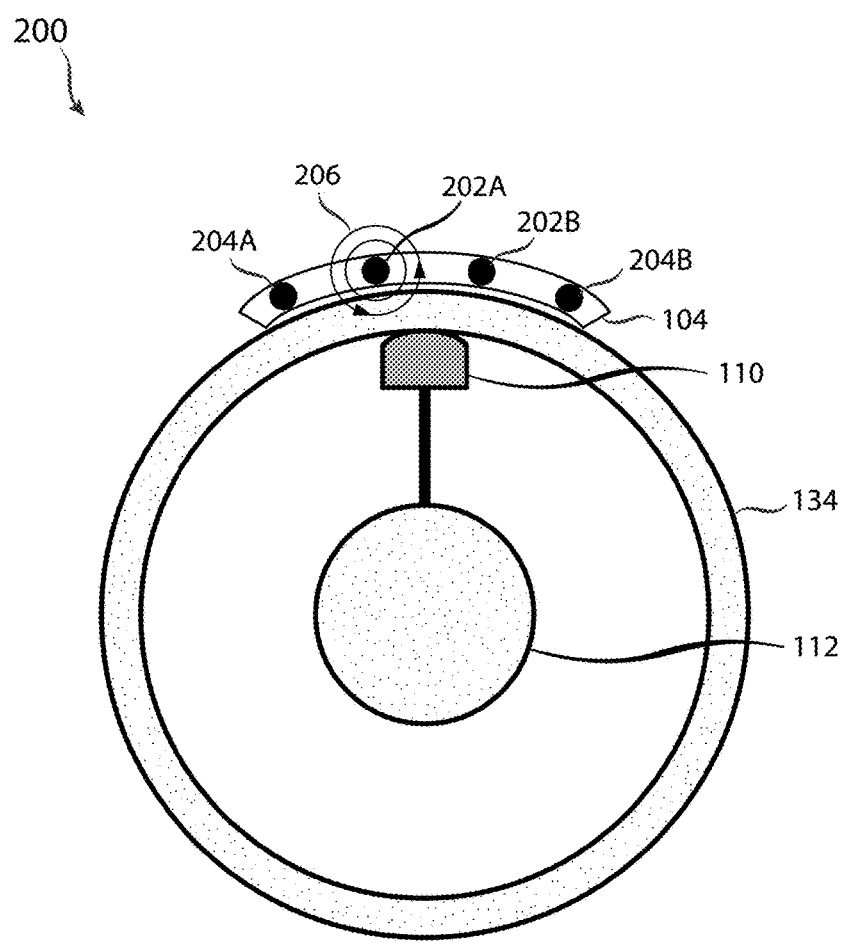
FIG. 2A illustrates a schematic diagram of a sensor system with a rotating sensor.

FIG. 2A illustrates a schematic diagram of an example configuration 200 of a rotating sensor 110 for detecting magnetic fields from different locations inside a wellbore casing. As shown, wire system 104 can be placed on an outside of the casing 134. Wire system 104 can include electroconductive cables 202A-B and non-electroconductive cables 204A-B. The non-electroconductive cables 204A-B can be cables that are not capable of carrying a current, such as fiber optic cables. On the other hand, the electroconductive cables 202A-B can include any cables capable of carrying a current, such as copper cables.

The electroconductive cables 202A-B can be insulated electric lines. Moreover, the electroconductive cables 202A-B can include an input line and a return or ground. In some configurations, the electroconductive cables 202A-B can be insulated and may have a resistive load between the input and return, or may be grounded at a downhole location.

Further, the electroconductive cables 202A-B and non-electroconductive cables 204A-B can be cased inside a protective material that allows the electroconductive cables 202A-B and non-electroconductive cables 204A-B to be packed together in the wire system 104. For example, the electroconductive cables 202A-B and non-electroconductive cables 204A-B can be contained inside a sensor system housing.

Sensor 110 can be coupled with tools unit 112. Moreover, sensor 110 can be rotated by the tools unit 112 around an inside diameter of the casing 134. This rotation can allow the sensor 110 to obtain measurements at different respective locations or angles. For example, sensor 110 can obtain a first measurement at a current location, rotate n degrees and take a second measurement at the new location, rotate another n degrees and take a third measurement at the next location, and so forth. The sensor 110 can continue taking measurements and rotating until a threshold number of measurements have been obtained, a threshold number of rotations have been made, a threshold amount of angles or diameter has been captured, a full rotation has been achieved, a threshold degree of accuracy has been achieved, etc.

The sensor 110 can detect a magnetic field 206 generated by a signal or current transmitted through electroconductive cable 202A. The sensor 110 can detect the magnetic field 206 and a pattern, such as a current and/or frequency, of the signal transmitted through the electroconductive cable 202A. The sensor 110 can obtain different measurements of the magnetic field 206, including any patterns of the signal, as it rotates around the inside diameter of the casing 134. The location and/or placement of the electroconductive cables 202A-B and non-electroconductive cables 204A-B can be inferred based on the measurement of the sensor 110 at each location.

For example, the different measurements can indicate the proximity of the sensor 110 to the electroconductive cables 202A-B at each location. Based on the proximity at each location, the location and placement of the electroconductive cables 202A-B can be inferred. Moreover, since the non-electroconductive cables 204A-B are located alongside the electroconductive cables 202A-B within the cable system 104, the location and placement of the electroconductive cables 202A-B can then be used to infer or determine the location and placement of the non-electroconductive cables 204A-B.

Figure 2B:
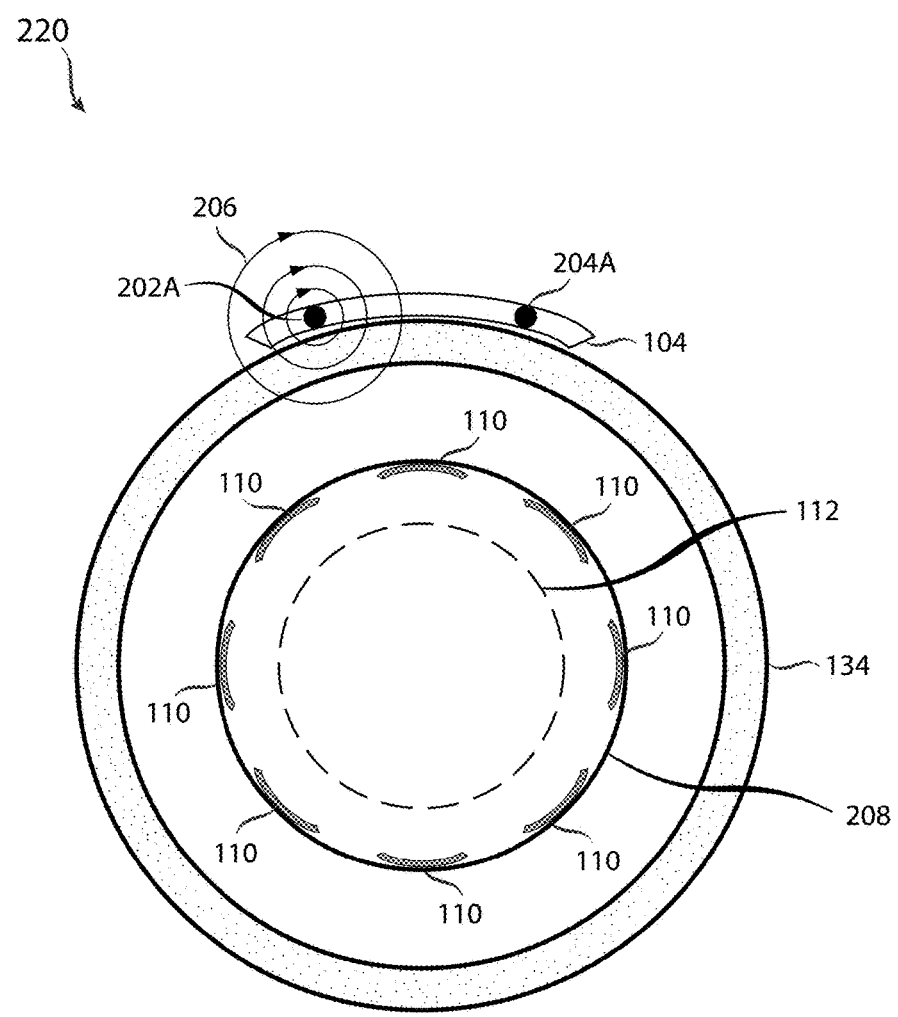
FIG. 2B illustrates a schematic diagram of a sensor system with multiple sensors.

FIG. 2B illustrates a schematic diagram of an example configuration 220 of a sensor system with multiple sensors 110 for detecting magnetic fields from different locations inside a wellbore casing. As shown, wire system 104 can be placed on an outside of the casing 134. Wire system 104 can include electroconductive cable 202A and non-electroconductive cable 204A. In some configurations, the wire system 104 can also include additional electroconductive cables and/or non-electroconductive cables.

The sensor system in configuration 220 can include multiple sensors 110 located radially around the outside of the tool 112. The multiple sensors 110 can be contained in a sensor housing system 208. The sensor housing system 208 can house the multiple sensors 110 at specific locations or angles and/or within specific proximities to each other. Moreover, the sensor housing system 208 can contain the multiple sensors 110 and/or couple the multiple sensors 110 to the outside of the tool 112.

The electroconductive cable 202A can carry a signal and current to generate magnetic field 206. The signal can be a signal having a known or predetermined pattern, such as a predetermined current or frequency pattern. Moreover, the sensor system in configuration 220 can use the multiple sensors 110 to detect the magnetic field 206, as well as any pattern of the signal. For example, one or more of the multiple sensors 110 can detect and measure the magnetic field 206 and/or pattern of the associated signal, to determine the placement and/or location of electroconductive cable 202A, as well as non-electroconductive cable 204A.

As previously noted, the measurements from the multiple sensors 110 can identify a current and/or frequency pattern of the signal in electroconductive cable 202A, in addition to detecting the magnetic field 206. Moreover, the readings or measurements from the multiple sensors 110 can be associated with an angular position from an internal and/or external accelerometer package. The sensor system in configuration 220 can utilize offsets from the internal and/or external accelerometer tool to estimate the angular position(s). The readings and associated angular positions can be sent up hole, for example to processing system 106, surface tools unit 114, and/or any other processing device.

The measurements from the multiple sensors 110, as well as the associated angular positions, can be used to determine or infer the placement and/or position of the electroconductive cable 202A relative to the casing 134 and/or tool 112. The placement and/or position of the electroconductive cable 202A can then be used to determine or infer the placement and/or position of the non-electroconductive cable 204A.

Figure 3:
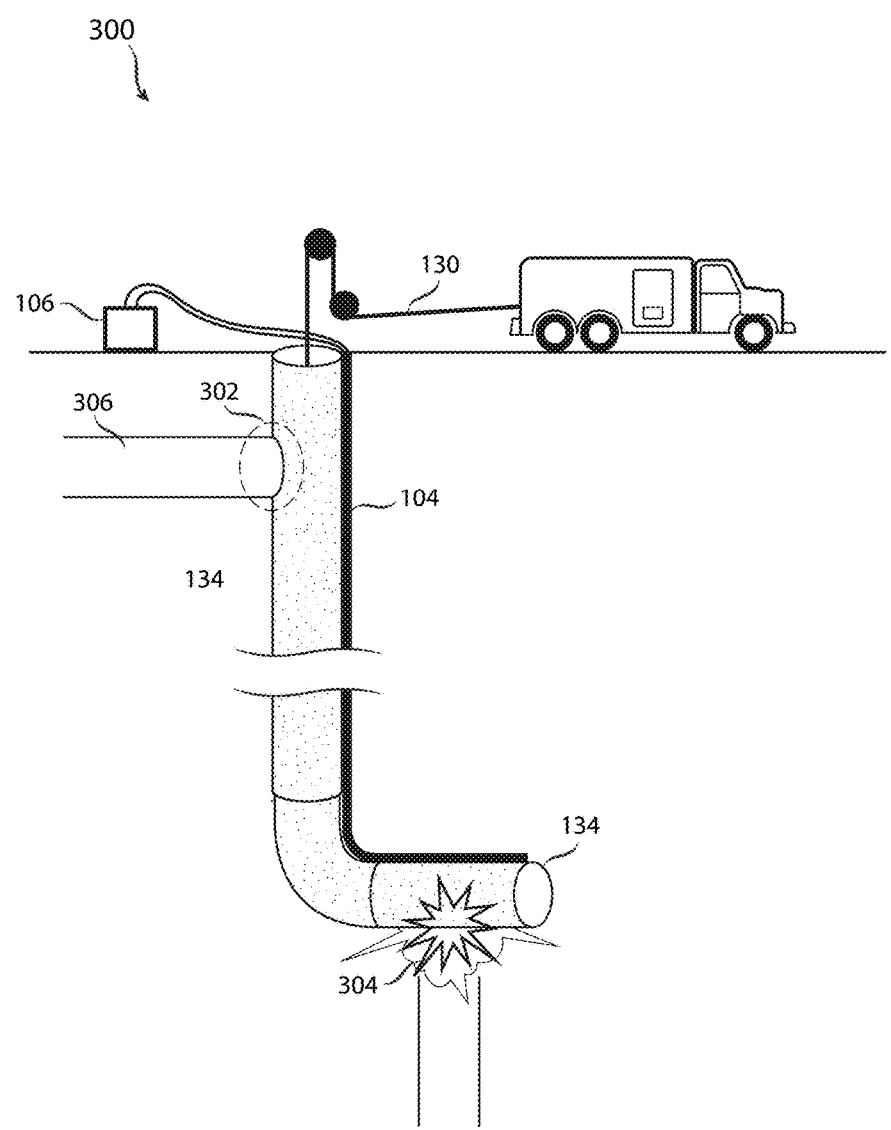
FIG. 3 illustrates a schematic diagram of a downhole environment with a sensor system for use when perforating a casing having a wire system.

FIG. 3 illustrates a schematic diagram of an example uphole/downhole wellbore system 300 with casing perforations 302. The wellbore system 300 can include a casing 134 for the wellbore, as previously explained. The cable system 104 can run alongside an outside of the casing 134. The cable system 104 can be implemented prior to one or more perforations of the casing 134. Accordingly, when performing perforations of the casing 134, the cable system 104 can be damaged if the perforations are performed too close to the cable system 104. The sensor system 110, as previously discussed and further described below with reference to FIG. 4, can be used to infer or determine the placement and/or location of the cable system 104 relative to the casing 134, in order to avoid damaging the cable system 104 when performing perforations of the casing 134.

As shown in FIG. 3, casing 134 can be perforated at perforation point 302 of the casing. Perforation point 302 can be located sufficiently far from the cable system 104 so as to avoid damaging any cables or lines in the cable system 104. Perforation of the casing 134 at perforation point 302 can provide an access point 306 to the inside of the casing 134, as well as any materials in the wellbore, such as hydrocarbons.

Other perforation points can be identified for perforating casing 134 without damaging the cable system 104. For example, perforation point 304 can be selected for perforating the casing 134 without perforating the cable system 104. The perforation of the casing 134 can be performed in various ways. For example, explosives can be used to perforate the casing 134 at perforation point 304. Knowing the placement and/or location of the cable system 104 can minimize the risk of perforating or damaging the cables or lines in the cable system 104.

As one of ordinary skill in the art will recognize, the casing 134 may include more or less perforations than shown in FIG. 3. The perforations shown in FIG. 3 are non-limiting examples provided for the sake of clarity and explanation purposes. Moreover, the casing 134 can be perforated in other locations, planes, and/or angles than those shown in FIG. 3. For example, the casing 134 can be perforated in a horizontal plane or a horizontal portion of the casing 134, a vertical plane or vertical portion of the casing 134, or any other plane or portion of the casing 134. In addition, the depth at which a perforation is performed can vary. Indeed, the casing 134 can be perforated at any depth.

Figure 4:
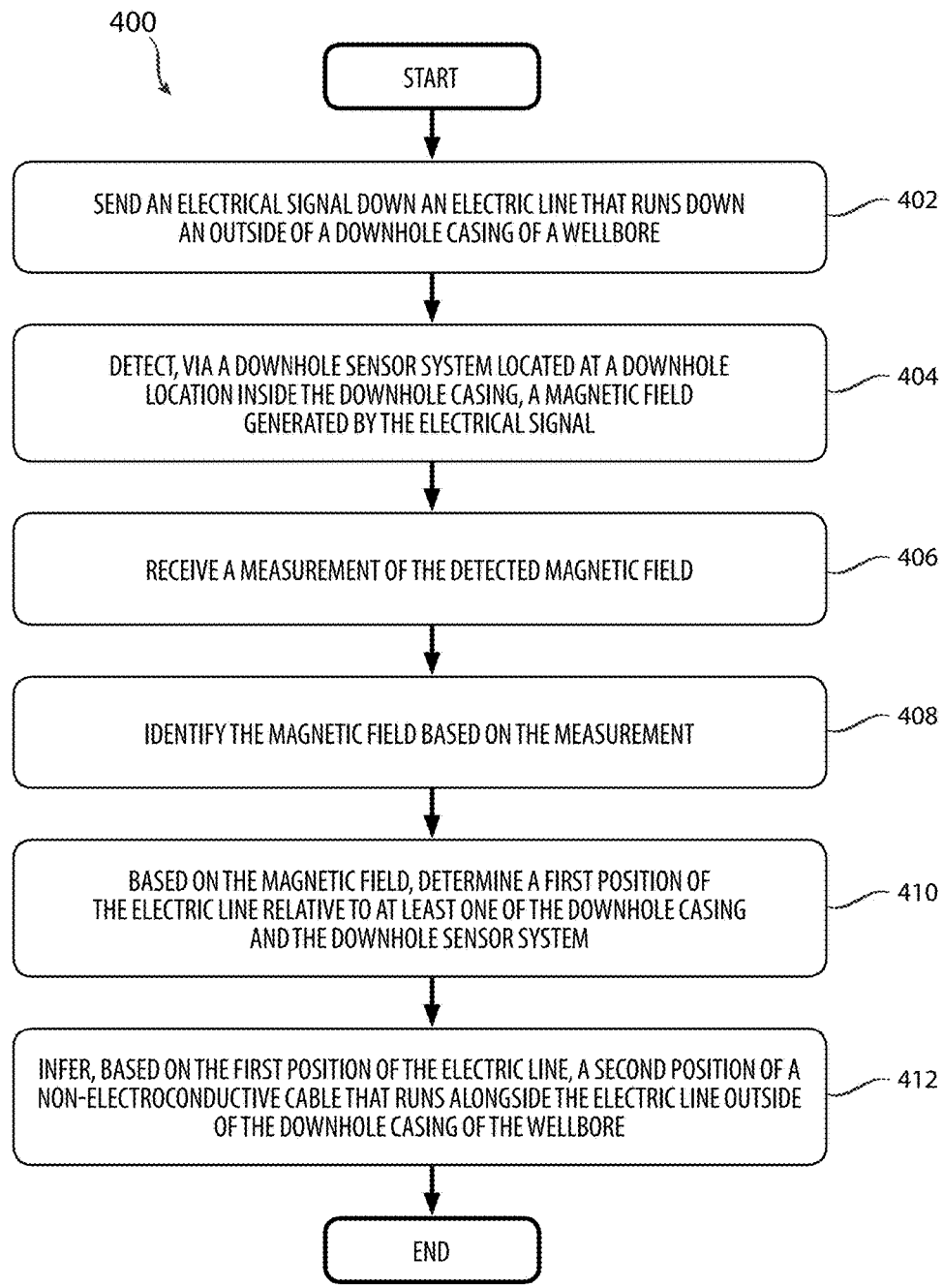
FIG. 4 illustrates an example method embodiment.

Having disclosed some basic system components and concepts, the disclosure now turns to the example method embodiment 400 shown in FIG. 4. For the sake of clarity, the method is described in terms of processing system 106 and sensor system 110, as shown in FIGS. 1A and 1B, configured to practice the various steps of the method. The steps outlined herein are exemplary and can be implemented in any combination thereof, including combinations that exclude, add, or modify certain steps.

At step 402, processing system 106 can send an electrical signal down an electric line (e.g., electroconductive cable 202A) that runs down an outside of a downhole casing (e.g., casing 134) of a wellbore (e.g., wellbore 48). The electric line can be part of a cable system, such as cable system 104, which includes one or more non-electroconductive cables, such as fiber optic cables. Moreover, the electrical signal can be based on a specific frequency and/or current pattern. For example, the electrical signal can be pulsed or transmitted by processing system 106 according to a known or predetermined pattern, such as a predetermined frequency pattern. The pattern of the electrical signal can also differ from the pattern of previous electrical signals transmitted through the electric line. For example, the electrical signal can have a predetermined pattern that is varied so as to be distinguishable from any anomalies that may arise when detecting the cable positioning as described below.

In addition, the electrical signal can generate a magnetic field, which can be detected by one or more sensors, as described below, to determine a placement and/or location of the electric line and any non-electroconductive cables running alongside the electric line or otherwise bundled or coupled with the electric line as part of a cable system or a group of adjacent cable systems. The magnetic field can have specific parameters, properties or patterns, such as field properties and strength, based on the pattern of the electrical signal.

At step 404, a sensor system 110 located at a downhole location inside the downhole casing, can detect a magnetic field generated by the electrical signal. The magnetic field can be generated by a current of the electrical signal moving through the electric line. Moreover, when detecting the magnetic field, sensor system 110 can also detect a pattern of the electrical signal, such as a current and/or frequency pattern.

Sensor system 110 can obtain measurements or readings of the detected magnetic field and/or the electrical signal. The measurements can identify the magnetic field and any parameters or characteristics of the electrical signal and/or the magnetic field, such as a current and/or frequency pattern of the signal, a strength of the magnetic field and/or the signal, a wavelength, field properties, direction, distance, and/or any other characteristics of the magnetic field or the electrical signal. Sensor system 110 can provide any measurements or readings of the magnetic field and electrical signal to one or more devices, such as processing system 106.

If the sensor system 110 includes a single rotating sensor, as illustrated in FIG. 2A, the measurements can include multiple measurements obtained by the sensor system 110 at various angles or positions within a rotation or trajectory of the sensor system 110. For example, the single rotating sensor can rotate around an inside or inner diameter of the downhole casing (e.g., casing 134), and obtain measurements from different positions as it rotates. The measurements can thus represent measurements taken at various locations around the inside or inner diameter of the downhole casing.

If the sensor system 110 includes multiple sensors located radially around an inside diameter of the downhole casing or an outside diameter of a tool coupled with the sensor system 110, such as tool 112, the measurements can include respective measurements from the multiple sensors. The respective measurements can provide measured results from various locations around the inside or inner diameter of the downhole casing.

Measurements obtained from various locations around the inside or inner diameter of the downhole casing can help determine the angular and/or relative position of the electric line carrying the electrical signal and generating the magnetic field. For example, the measurements can be compared to infer location, placement, and/or positioning information based on respective characteristics of the measurements, which can also be considered or analyzed in view of the respective positions or locations associated with the various measurements.

For example, measurement A obtained by a sensor (e.g., sensor A) located at position or angle A, can be compared with measurement B obtained from a sensor (e.g., sensor A or sensor B) located at position or angle B. Based on the comparison, the magnetic field can be determined to be closer to position or angle A or B. Measurements from other positions or angles, obtained from the same or a different sensor, can be compared with measurements A and B to further narrow the position or location of the magnetic field.

At step 406, the surface tools unit 114 and/or the tools 112 can receive one or more measurements of the detected magnetic field. The measurements can represent or include one or more parameters of the magnetic field and/or the electrical signal. The one or more parameters can include properties, characteristics, and/or data associated with the magnetic field and/or the electrical signal, such as magnetic field properties or characteristics, wavelength information, strength information, direction, distance, current patterns, frequency patterns, etc. For example, the one or more parameters can define magnetic field properties, signal or magnetic field status or configuration information, and/or pattern information, such as current or frequency pattern information associated with the electrical signal.

At step 408, the surface tools unit 114 and/or the tools 112 can identify one or more parameters of the magnetic field based on the one or more measurements. Based on the one or more parameters, at step 410, the surface tools unit 114 and/or tools 112 can determine a first position of the electric line relative to the downhole casing and/or the sensor system 110. For example, the surface tools unit 114 and/or tools 112 can determine the location, angular position, and/or placement of the electric line outside the downhole casing.

The surface tools unit 114 and/or tools 112 can determine the position of the electric line based on parameters and/or characteristics of the magnetic field and/or the electrical signal, such as specific properties, conditions, or patterns, for example. Based on parameters or characteristics of the magnetic field and/or the electrical signal, the surface tools unit 114 and/or tools 112 can determine or infer various aspects of the magnetic field and the electrical signal, such as magnetic field properties, a signal or magnetic field strength, a wavelength, a field direction, a field or signal distance, a magnetic field or signal pattern (e.g., a current pattern, frequency pattern, etc.), and so forth. This information can then be used to infer or determine the first position of the electric line.

Based on the first position of the electric line, at step 412, the surface tools unit 114 and/or tools 112 can infer a second position of a non-electroconductive cable that runs alongside the electric line outside of the downhole casing of the wellbore. For example, knowing that the non-electroconductive cable and the electric line have a relatively close proximity, the surface tools unit 114 and/or tools 112 can determine the position of the non-electroconductive cable based on the position of the electric line.

The surface tools unit 114 and/or tools 112 can determine the angular position and placement of the non-electroconductive cable despite the non-electroconductive cable's inability to run a current. The angular position and placement of the non-electroconductive cable can then be used when selecting a location for perforating the casing, in order to avoid perforating or damaging the non-electroconductive cable.

Steps 402-412 can be executed one or more additional times, prior to other perforations of the casing, to again determine or infer position, locations, and/or placement information in order to avoid perforating or damaging the non-electroconductive cable or any other non-electroconductive cables.

Moreover, the data obtained from the method 400 can be used to generate a "map" of the electroconductive cable(s) and/or non-electroconductive cable(s). For example, mappings can be generated based on one or more determined or inferred positions of the non-electroconductive cable(s) and/or electroconductive cable(s).

In some cases, a separate "mapping" run (e.g., trip in the well 48) can be executed to estimate position data along every zone or point of interest along the casing 134. One or more perforations can then be executed after the "map" is generated and/or the position data along the various zones or points of interest are estimated. This can allow operators, service companies, etc., to generate their perforation plans off the entire map generated for the casing 134 and relative position of cable(s).

The electrical signal sent through the electric line to generate the magnetic field in order to determine the position of cables, can be varied according to different predetermined patterns. Variations in the signal pattern can help differentiate from anomalies that may arise in the process. Knowing or understanding the pattern of the signal transmitted through the electroconductive cables can also help differentiate from anomalies and identify particular details for inferring placement or position information.

While steps 406-412 are described herein as being performed by surface tools unit 114 and/or tools 112, other configurations are also contemplated herein. For example, one or more of steps 406-412 can otherwise or in addition be performed by the processing system 106.

Figure 5A:
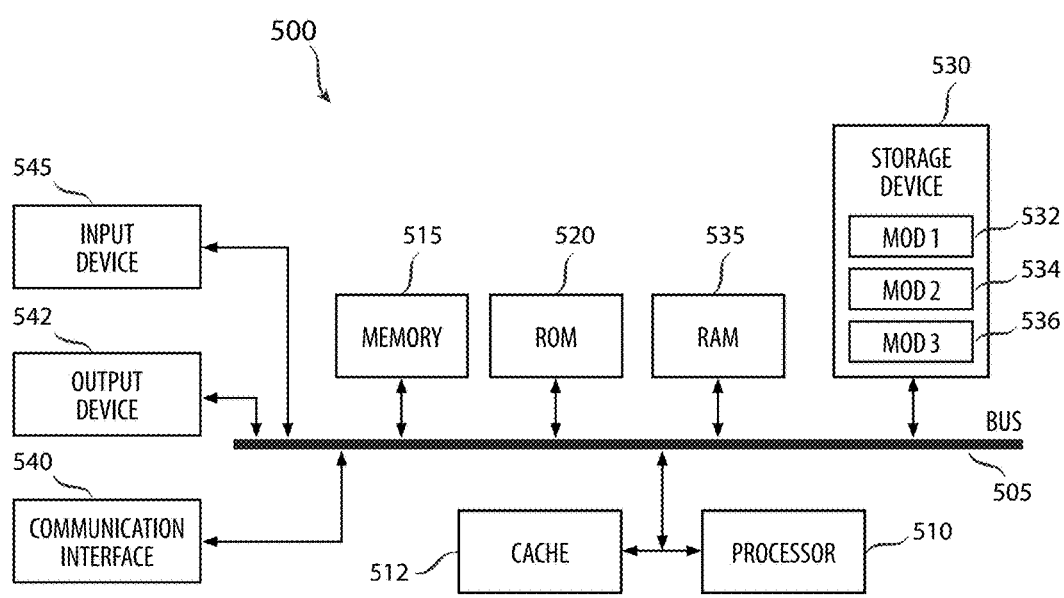
FIG. 5A and FIG. 5B illustrate schematic diagrams of example system embodiments.
Figure 5B:
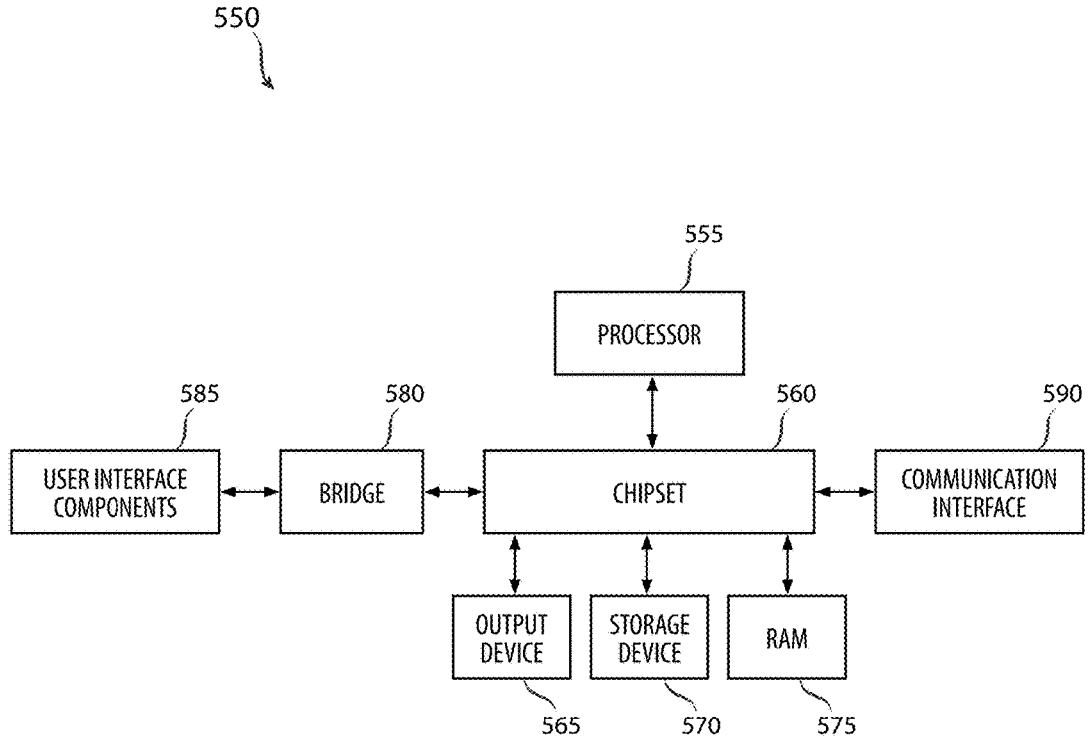

FIG. 5A and FIG. 5B illustrate example system embodiments. The more appropriate embodiment will be apparent to those of ordinary skill in the art when practicing the present technology. Persons of ordinary skill in the art will also readily appreciate that other system embodiments are possible.

FIG. 5A illustrates a conventional system bus computing system architecture 500 wherein the components of the system are in electrical, optical (photonic) communication with each other using a bus 505. System 500 can include a processing unit (CPU, GPU, or processor) 510 and a system bus 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware module or software module, such as module 1 532, module 2 534, and module 3 536 stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 542 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include software modules 532, 534, 536 for controlling the processor 510. Other hardware or software modules are contemplated. The storage device 530 can be connected to the system bus 505. In one aspect, a hardware module that performs a particular function can include the software component stored in a computer-readable medium in connection with the necessary hardware components, such as the processor 510, bus 505, display 535, and so forth, to carry out the function.

FIG. 5B illustrates an example computer system 550 having a chipset architecture that can be used in executing the described method and generating and displaying a graphical user interface (GUI). Computer system 550 can be computer hardware, software, and firmware that can be used to implement the disclosed technology. System 550 can include a processor 555, representative of any number of physically and/or logically distinct resources capable of executing software, firmware, and hardware configured to perform identified computations. Processor 555 can communicate with a chipset 560 that can control input to and output from processor 555. Chipset 560 can output information to output device 565, such as a display, and can read and write information to storage device 570, which can include magnetic media, and solid state media. Chipset 560 can also read data from and write data to RAM 575. A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 555 analyzing data stored in storage 570 or 575. Further, the machine can receive inputs from a user via user interface components 585 and execute appropriate functions, such as browsing functions by interpreting these inputs using processor 555.

It can be appreciated that systems 500 and 550 can have more than one processor 510 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

The computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the aforementioned description can be implemented using computer-executable instructions that are stored or otherwise available from computer readable media. Such instructions can comprise instructions and data which cause or otherwise configure a general purpose computer, special purpose computer, or special purpose processing device to perform a certain function or group of functions. Portions of computer resources used can be accessible over a network. The computer executable instructions may be binaries, intermediate format instructions such as assembly language, firmware, or source code. Computer-readable media that may be used to store instructions, information used, and/or information created during methods according to the aforementioned description include magnetic or optical disks, flash memory, USB devices provided with non-volatile memory, networked storage devices, and so on.

Devices implementing methods according to these disclosures can comprise hardware, firmware and/or software, and can take any of a variety of form factors. Such form factors can include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device.

The instructions, media for conveying such instructions, computing resources for executing them, and other structures for supporting such computing resources are means for providing the functions described in these disclosures.

Statements of the Disclosure Include:

Statement 1: A method comprising: sending, via a first device, an electrical signal down an electric line that runs down an outside of a downhole casing of a wellbore; detecting, via a downhole sensor system located at a downhole location inside the downhole casing, a magnetic field generated by a current of the electrical signal; identifying one or more characteristics associated with the magnetic field, the one or more characteristics including at least one of a magnetic field parameter, a frequency pattern, and a current pattern; based on the one or more characteristics associated with the magnetic field, determining a first position of the electric line relative to at least one of the downhole casing and the downhole sensor system; and inferring, based on the first position of the electric line, a second position of a non-electroconductive cable that runs alongside the electric line outside of the downhole casing of the wellbore.

Statement 2: The method according to Statement 1, wherein the second position is relative to at least one of the downhole casing, the downhole sensor system, and the electric line.

Statement 3: The method according to Statement 1 or Statement 2, further comprising determining, based on the second position, an angular position of the non-electroconductive cable relative to the downhole casing.

Statement 4: The method according to any one of Statements 1 to 3, wherein the downhole sensor system comprises a sensor configured to rotate around an inner diameter of the downhole casing.

Statement 5: The method according to any one of Statements 1 to 4, wherein the sensor is coupled with a tool unit that runs down an inside of the downhole casing, the tool unit being configured to rotate, wherein rotation of the tool unit causes the sensor to rotate around the inner diameter of the downhole casing.

Statement 6: The method according to any one of Statements 1 to 5, wherein determining the first position of the electric line is further based on a current angular position of the sensor relative to the downhole casing.

Statement 7: The method according to any one of Statements 1 to 6, wherein the downhole sensor system comprises a plurality of sensors located radially around an outside of a wellbore tool that runs down an inside of the downhole casing.

Statement 8: The method according to any one of Statements 1 to 7, wherein determining the first position of the electric line is based on sensor measurements from the plurality of sensors, the sensor measurements being associated with the magnetic field.

Statement 9: The method according to any one of Statements 1 to 8, wherein determining the first position of the electric line comprises generating, by the plurality of sensors, the sensor measurements and comparing respective sensor measurements from the plurality of sensors.

Statement 10: The method according to any one of Statements 1 to 9, wherein the non-electroconductive cable comprises a fiber optic cable, and wherein the electric line is an insulated electric line including one or more electroconductive cables.

Statement 11: The method according to any one of Statements 1 to 10, further comprising perforating the casing based on at least one of the first position or the second position.

Statement 12: A system comprising: one or more downhole sensors located at a downhole location inside a downhole casing of a wellbore, the one or more downhole sensors being configured to detect a magnetic field generated by a current of an electrical signal transmitted through an electric line that runs down an outside of the downhole casing; one or more processors; and a computer-readable storage medium having stored therein instructions which, when executed by the one or more processors, cause the one or more processors to perform operations comprising: sending the electrical signal down the electric line; receiving, from the one or more downhole sensors, one or more measurements associated with the magnetic field; based on the one or more measurements, identifying one or more characteristics of the magnetic field, the one or more characteristics including at least one of a magnetic field parameter, a frequency pattern associated with the electrical signal, and a current pattern associated with the electrical signal; based on the one or more characteristics of the magnetic field, determining a first position of the electric line relative to at least one of the downhole casing and the one or more downhole sensors; and inferring, based on the first position of the electric line, a second position of a non-electroconductive cable that runs alongside the electric line outside of the downhole casing of the wellbore.

Statement 13: The system according to Statement 12, wherein the second position is relative to at least one of the downhole casing, the downhole sensor system, and the electric line; and wherein the second position includes an angular position of the non-electroconductive cable relative to the downhole casing.

Statement 14: The system according to Statement 12 or 13, further comprising a tool unit that runs down an inside of the downhole casing, the tool unit being configured to rotate, wherein the one or more sensors comprise a sensor coupled with the tool unit, wherein a rotation of the tool unit causes the sensor to rotate around an inner diameter of the downhole casing.

Statement 15: The system according to any of Statements 12 to 14, wherein determining the first position of the electric line is further based on a current angular position of the sensor relative to the downhole casing.

Statement 16: The system according to any one of Statements 12 to 15, wherein the one or more sensors comprise a plurality of sensors located radially around an outside of a wellbore tool that runs down an inside of the downhole casing, and wherein determining the first position of the electric line is based on sensor measurements from the plurality of sensors, the sensor measurements being associated with the magnetic field.

Statement 17: A computer-readable device having stored therein instructions which, when executed by a processor, cause the processor to perform operations comprising: sending an electrical signal down an electric line that runs down an outside of a downhole casing of a wellbore; receiving, from a downhole sensor system located at a downhole location inside the downhole casing, a measurement of a magnetic field sensed by the downhole sensor system, the magnetic field being generated by a current of the electrical signal; based on the measurement, identifying one or more characteristics associated with the magnetic field, the one or more characteristics including at least one of a magnetic field parameter, a frequency pattern associated with the electrical signal, and a current pattern associated with the electrical signal; based on the one or more characteristics associated with the magnetic field, determining a first position of the electric line relative to at least one of the downhole casing and the downhole sensor system; and inferring, based on the first position of the electric line, a second position of a non-electroconductive cable that runs alongside the electric line outside of the downhole casing of the wellbore.

Statement 18: The computer-readable device according to Statement 17, wherein the second position is relative to at least one of the downhole casing, the downhole sensor system, and the electric line.

Statement 19: The computer-readable device according to Statement 17 or 18, storing additional instructions which, when executed by the processor, cause the processor to perform an operation comprising determining, based on the second position, an angular position of the non-electroconductive cable relative to the downhole casing.

Statement 20: The computer-readable device according to any of Statements 17 to 19, wherein the downhole sensor system includes a sensor coupled with a tool unit and configured to rotate around an inner diameter of the downhole casing, the tool unit running down an inside of the downhole casing, wherein determining the first position of the electric line is further based on a current angular position of the sensor relative to the downhole casing.

Statement 21: The computer-readable device according to any one of Statements 17 to 20, wherein the downhole sensor system includes a plurality of sensors located radially around an outside of a wellbore tool that runs down an inside of the downhole casing, wherein determining the first position of the electric line is based on sensor measurements from the plurality of sensors, the sensor measurements being associated with the magnetic field.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. Rather, the described features and steps are disclosed as possible components of systems and methods within the scope of the appended claims. Moreover, claim language reciting "at least one of" a set indicates that one member of the set or multiple members of the set satisfy the claim.

What is claimed is:

1. A method comprising:
   sending, using one or more processors, an electrical signal down an electric line that runs down an outside of a downhole casing of a wellbore;

obtaining, via the one or more processors and from one or more downhole sensors located at a downhole location inside the downhole casing, one or more measurements of a magnetic field sensed by the one or more downhole sensors and generated by a current of the electrical signal;

based on the one or more measurements, identifying, via the one or more processors, one or more characteristics associated with the magnetic field, the one or more characteristics comprising at least one of a magnetic field parameter, a frequency pattern associated with the electrical signal, and a current pattern associated with the electrical signal;

based on the one or more characteristics associated with the magnetic field, determining via the one or more processors, a first position of the electric line relative to at least one of the downhole casing and the one or more downhole sensors; and based on the first position of the electric line, inferring, via the one or more processors, a second position of a non-electroconductive cable that runs alongside the electric line outside of the downhole casing of the wellbore.

2. The method of claim 1, wherein the second position is relative to at least one of the downhole casing, the one or more downhole sensors, and the electric line.

3. The method of claim 2, further comprising determining, based on the second position, an angular position of the non-electroconductive cable relative to the downhole casing.

4. The method of claim 1, wherein the one or more downhole sensors comprise a sensor configured to rotate around an inner diameter of the downhole casing.

5. The method of claim 4, wherein the sensor is coupled with a tool unit that runs down an inside of the downhole casing, the tool unit being configured to rotate, wherein rotation of the tool unit causes the sensor to rotate around the inner diameter of the downhole casing.

6. The method of claim 5, wherein determining the first position of the electric line is further based on a current angular position of the sensor relative to the downhole casing.

7. The method of claim 1, wherein the one or more downhole sensors comprise a plurality of sensors located radially around an outside of a wellbore tool that runs down an inside of the downhole casing.

8. The method of claim 7, wherein determining the first position of the electric line is based on sensor measurements from the plurality of sensors, the sensor measurements being associated with the magnetic field.

9. The method of claim 8, wherein determining the first position of the electric line comprises generating, by the plurality of sensors, the sensor measurements and comparing respective sensor measurements from the plurality of sensors.

10. The method of claim 1, wherein the non-electroconductive cable comprises a fiber optic cable, and wherein the electric line is an insulated electric line comprising one or more electroconductive cables.

11. The method of any one of claims 1 to 10, further comprising perforating the casing based on at least one of the first position or the second position.

12. A system comprising:
one or more downhole sensors located at a downhole location inside a downhole casing of a wellbore, the one or more downhole sensors being configured to detect a magnetic field generated by a current of an electrical signal transmitted through an electric line that runs down an outside of the downhole casing;

one or more processors; and a computer-readable storage medium having stored therein instructions which, when executed by the one or more processors, cause the one or more processors to perform operations comprising:

sending the electrical signal down the electric line, the electrical signal generating the magnetic field based on the current;

receiving, from the one or more downhole sensors, one or more measurements associated with the magnetic field;

based on the one or more measurements, identifying one or more characteristics of the magnetic field, the one or more characteristics comprising at least one of a magnetic field parameter, a frequency pattern associated with the electrical signal, and a current pattern associated with the electrical signal;

based on the one or more characteristics of the magnetic field, determining a first position of the electric line relative to at least one of the downhole casing and the one or more downhole sensors; and inferring, based on the first position of the electric line, a second position of a non-electroconductive cable that runs alongside the electric line outside of the downhole casing of the wellbore.

13. The system of claim 12, wherein the second position comprises an angular position of the non-electroconductive cable relative to the downhole casing.

14. The system of claim 12, further comprising a tool unit that runs down an inside of the downhole casing, the tool unit being configured to rotate, wherein the one or more downhole sensors comprise a sensor coupled with the tool unit, wherein a rotation of the tool unit causes the sensor to rotate around an inner diameter of the downhole casing.

15. The system of claim 14, wherein determining the first position of the electric line is further based on a current angular position of the sensor relative to the downhole casing.

16. The system of claim 12, wherein the one or more downhole sensors comprise a plurality of sensors located radially around an outside of a wellbore tool that runs down an inside of the downhole casing, and wherein determining the first position of the electric line is based on sensor measurements from the plurality of sensors, the sensor measurements being associated with the magnetic field.

17. A computer-readable device having stored therein instructions which, when executed by a processor, cause the processor to perform operations comprising:

sending an electrical signal down an electric line that runs down an outside of a downhole casing of a wellbore;

receiving, from a downhole sensor system located at a downhole location inside the downhole casing, a measurement of a magnetic field sensed by the downhole sensor system, the magnetic field being generated by a current of the electrical signal;

based on the measurement, identifying one or more characteristics of the magnetic field, the one or more characteristics comprising at least one of a magnetic field property, a frequency pattern associated with the electrical signal, and a current pattern associated with the electrical signal;

based on the one or more characteristics of the magnetic field, determining a first position of the electric line relative to at least one of the downhole casing and the downhole sensor system; and inferring, based on the first position of the electric line, a second position of a non-electroconductive cable that runs alongside the electric line outside of the downhole casing of the wellbore.

18. The computer-readable device of claim 17, wherein the second position is relative to at least one of the downhole casing, the downhole sensor system, and the electric line.

19. The computer-readable device of claim 18, wherein the second position comprises an angular position of the non-electroconductive cable relative to the downhole casing.

20. The computer-readable device of claim 17, wherein the downhole sensor system comprises a sensor coupled with a tool unit and configured to rotate around an inner diameter of the downhole casing, the tool unit running down an inside of the downhole casing, wherein determining the first position of the electric line is further based on a current angular position of the sensor relative to the downhole casing.

21. The computer-readable device of claim 17, wherein the downhole sensor system comprises a plurality of sensors located radially around an outside of a wellbore tool that runs down an inside of the downhole casing, wherein determining the first position of the electric line is based on sensor measurements from the plurality of sensors, the sensor measurements being associated with the magnetic field.

* * * * *